(12) United States Patent
Williams et al.

(10) Patent No.: US 10,191,961 B2
(45) Date of Patent: Jan. 29, 2019

(54) SYSTEMS AND METHODS FOR MANAGING THE SYNCHRONIZATION OF KEY VALUES AND ASSOCIATED DATA ACROSS DATABASES

(71) Applicant: MasterCard International Incorporated, Purchase, NY (US)

(72) Inventors: Kyle Williams, O'Fallon, MO (US); David J. Senci, Troy, IL (US); Laurie Ann Nicoletti, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 218 days.

(21) Appl. No.: 15/379,048

(22) Filed: Dec. 14, 2016

(65) Prior Publication Data
US 2018/0165344 A1 Jun. 14, 2018

(51) Int. Cl.
*G06F 17/30* (2006.01)
*H04L 29/06* (2006.01)
*G06F 21/62* (2013.01)

(52) U.S. Cl.
CPC .. *G06F 17/30581* (2013.01); *G06F 17/30283* (2013.01); *G06F 17/30312* (2013.01); *G06F 17/30477* (2013.01); *G06F 21/62* (2013.01); *H04L 63/083* (2013.01); *H04L 63/0861* (2013.01); *H04L 63/10* (2013.01)

(58) Field of Classification Search
CPC ............. G06F 17/30581; G06F 21/62; G06F 17/30312
USPC ........................................................ 726/4
See application file for complete search history.

(56) References Cited

U.S. PATENT DOCUMENTS

| | | | |
|---|---|---|---|
| 5,535,407 A | 7/1996 | Yanagawa et al. | |
| 6,073,140 A | 6/2000 | Morgan et al. | |
| 7,178,023 B1 * | 2/2007 | Ganapathy | G06F 21/606 709/212 |
| 7,240,192 B1 * | 7/2007 | Paya | H04L 63/0807 713/152 |
| 7,580,919 B1 | 8/2009 | Hannel et al. | |
| 8,255,464 B2 | 8/2012 | Wilkins | |

(Continued)

OTHER PUBLICATIONS

PCT International Search Report and Written Opinion, Application No. PCT/US2017/058433, dated Feb. 6, 2018, 13 pps.

*Primary Examiner* — Teshome Hailu
(74) *Attorney, Agent, or Firm* — Armstrong Teasdale LLP

(57) ABSTRACT

A data synchronization (DS) computing device is described herein, the DS computing device configured to retrieve an update request from a queue, the update request including a key value and a requesting party identifier. The key value identifies at least one data record. The DS computing device is also configured to identify key lookup data associated with the update request, the key lookup data including one or more updated data record elements, and determine whether a release is needed from at least one stakeholder associated with the key value. The DS computing device is configured to transmit a release request to the stakeholder, when the release is needed. The DS computing device is further configured to receive a release response from the stakeholder, the release response indicating that the release has been authorized, and transmit an update response to the requesting party, the update response including the key lookup data.

18 Claims, 6 Drawing Sheets

(56) References Cited

U.S. PATENT DOCUMENTS

| | | | |
|---|---|---|---|
| 8,924,523 | B1 | 12/2014 | Dickie |
| 8,935,804 | B1 | 1/2015 | Clark et al. |
| 9,292,706 | B2 | 3/2016 | Mashima et al. |
| 2005/0216524 | A1 | 9/2005 | Gomes et al. |
| 2006/0277598 | A1 | 12/2006 | Ahn |
| 2013/0212163 | A1* | 8/2013 | Shimomoto ....... H04N 1/00225 709/203 |
| 2013/0217365 | A1 | 8/2013 | Ramnani |
| 2014/0066044 | A1 | 3/2014 | Ramnani et al. |
| 2014/0330705 | A1 | 11/2014 | Wishart et al. |
| 2015/0101024 | A1* | 4/2015 | Leggette ............. H04L 67/1097 726/4 |
| 2015/0281966 | A1* | 10/2015 | Griot ................... H04W 12/08 726/5 |
| 2016/0253521 | A1 | 9/2016 | Esmailzadeh et al. |

* cited by examiner

SYSTEMS AND METHODS FOR MANAGING THE SYNCHRONIZATION OF KEY VALUES AND ASSOCIATED DATA ACROSS DATABASES

BACKGROUND

This field of the disclosure relates generally to managing the synchronization of information from a data source, more particularly, to network-based systems and methods for authorizing the release of updated key values and associated data from one data source to another.

Within a computer network, the same data may be stored in multiple locations (e.g., databases). For example, data may be stored in a first location within a network while the same data is also stored in another (second) location. In some cases, data stored in the first location may become outdated or stale when the same data is updated at the second location. In at least some of these cases, it is important to update the data stored in the first location with the updated data that is stored at the second location. However, there are many challenges associated with updating such stale data, especially when the data includes sensitive information.

A fundamental functionality common across database types, including relational and NoSQL databases, is the select operation. In general, the select operation returns data records, finite ordered lists of data elements, based upon selection criteria. In a database modeled using the concept of tables, a data record may be known as a row. For example, a database may process a select operation with the criteria that the $3^{rd}$ data record element (i.e., $3^{rd}$ column in a row associated with the data record) equals the integer 11.

A key, within the context of this disclosure, is defined to be the data field(s) (i.e., column(s)) within a set (e.g., table) upon which the select operation has optimal runtime. In some embodiments, all key values may be unique. In one embodiment, a database may build an index containing both the key values and a location reference to the full data record, and store this index in a volatile memory format having fast random read times. For optimal communication between two databases maintained by separate parties, the key values must be synchronized, allowing for efficient data access, and/or for information to be cross-referenced between parties. The information available based upon key value select operations, and/or join operations performed using key value matching between tables, may be known as key lookup data.

At least some known systems may provide for database key values to be synchronized. More specifically, some known systems may provide synchronization of information between a requesting party and a data provider. These known systems are limited in several ways. For example, these known systems do not protect against fraudulent requests, such as a requesting party requesting up-to-date information associated with data records fraudulently obtained. Moreover, these known systems may not notify stakeholders (e.g., users associated with the stored information) before up-to-date information is provided to the requesting party. Further, these known systems may not consider stakeholder preferences associated with a release of sensitive information to requesting parties. In light of the foregoing, an enhanced data synchronization system is needed, wherein the enhanced system addresses at least these problems.

BRIEF DESCRIPTION OF THE DISCLOSURE

In one aspect, a data synchronization (DS) computing device is provided. The DS computing device includes one or more processors in communication with one or more memory devices. The DS computing device is configured to retrieve an update request from a queue, the update request including a key value and a requesting party identifier. The key value identifies at least one respective data record. The DS computing device is also configured to identify key lookup data associated with the update request by performing one or more database operations on one or more data sources. The key lookup data includes one or more updated data record elements. The DS computing device is further configured to determine whether a release is needed from at least one stakeholder associated with the key value, and, when the release is needed, transmit a release request to the stakeholder. The release request includes the key value and the requesting party identifier. The DS computing device is still further configured to receive a release response from the stakeholder, the release response indicating that the release has been authorized, and transmit an update response to the requesting party, the update response including the key lookup data.

In a second aspect, a method of data synchronization between data sources is provided. The method is implemented using a data synchronization (DS) computing device including a processor in communication with a memory. The method includes retrieving an update request from a queue, the update request including a key value and a requesting party identifier. The key value identifies at least one respective data record. The method also includes identifying key lookup data associated with the update request by performing one or more database operations on one or more data sources. The key lookup data includes one or more updated data record elements. The method further includes determining whether a release is needed from at least one stakeholder associated with the key value, and, when the release is needed, transmitting a release request to the stakeholder. The release request includes the key value and the requesting party identifier. The method still further includes receiving a release response from the stakeholder, the release response indicating that the release has been authorized, and transmitting an update response to the requesting party, the update response including the key lookup data.

In yet another aspect, a non-transitory computer-readable storage medium having computer-executable instructions embodied thereon is provided. When executed by a data synchronization (DS) computing device including a processor in communication with a memory, the computer-executable instructions cause the DS computing device to retrieve an update request from a queue, the update request including a key value and a requesting party identifier. The key value identifies at least one respective data record. The computer-executable instructions also cause the DS computing device to identify key lookup data associated with the update request by performing one or more database operations on one or more data sources. The key lookup data includes one or more updated data record elements. The computer-executable instructions further cause the DS computing device to determine whether a release is needed from at least one stakeholder associated with the key value, and when the release is needed, transmit a release request to the stakeholder. The release request includes the key value and the requesting party identifier. The computer-executable instructions still further cause the DS computing device to receive a release response from the stakeholder, the release response indicating that the release has been authorized, and transmit an update response to the requesting party, the update response including the key lookup data.

BRIEF DESCRIPTION OF THE DRAWINGS

FIG. 1 is a simplified block diagram of an example computer system used for authorizing the release of information from a data source.

FIG. 2 illustrates an example configuration of a user computer device that may be used with the system shown in FIG. 1.

FIG. 3 illustrates an example configuration of a server computer device that may be used with the system shown in FIG. 1.

FIG. 4 is a message flowchart of an example implementation of the system shown in FIG. 2.

FIG. 5 is a flowchart illustrating an example process of authorizing the release of information from a data source using the system showing in FIG. 1.

FIG. 6 is a flowchart illustrating an example process of authenticating messages received by the system shown in FIG. 1.

DETAILED DESCRIPTION OF THE DISCLOSURE

Figure 1:
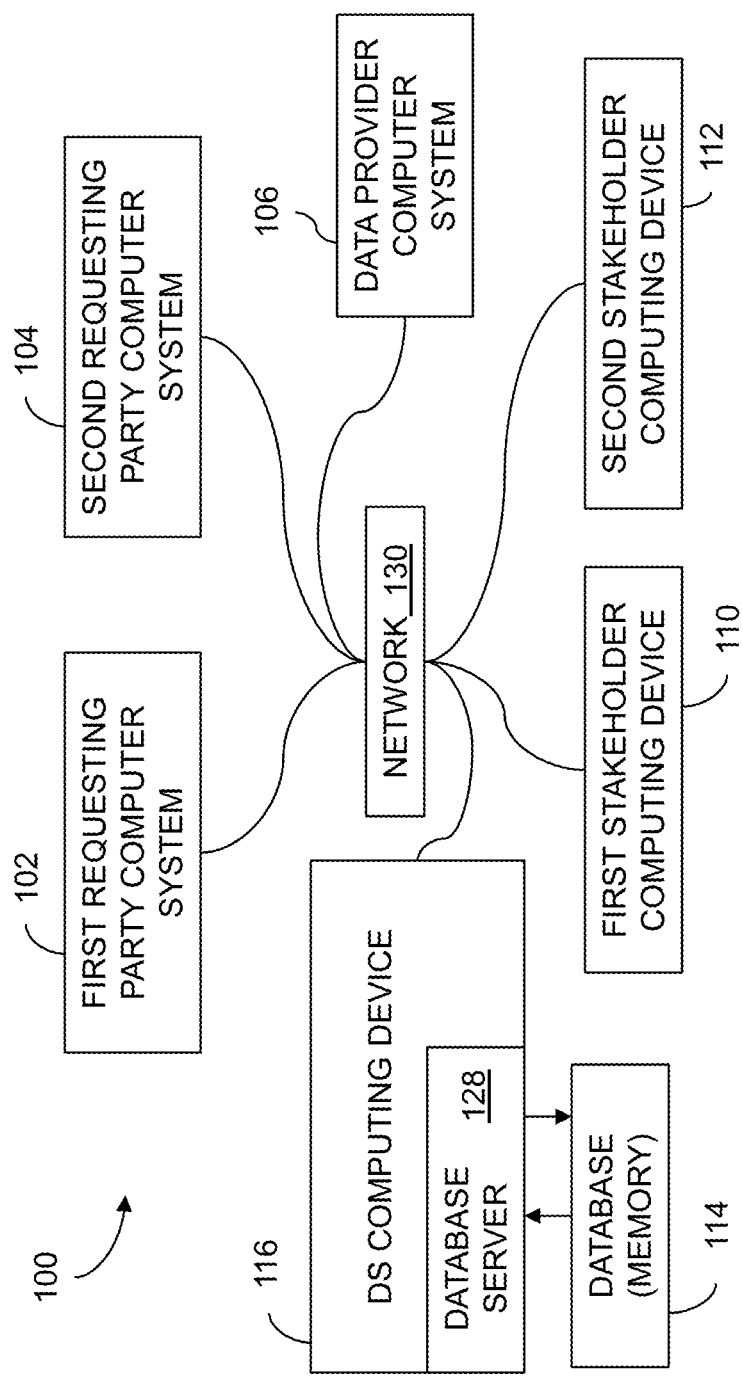
FIGS. 1-6 show example embodiments of the methods and systems described herein.

The systems and methods described herein are directed to managing the synchronization of key values and associated data across databases. A data synchronization (DS) system described herein is configured to receive update requests, generate release requests, receive update responses, authenticate update responses, and transmit update responses. In one example embodiment, the DS system includes a DS computing device specifically configured to manage the transmittal and/or synchronization of updated payment card data in response to an update request including outdated/stale payment card data. In some embodiments, the DS computing device is integral to a payment network that processes payment card transactions. In other embodiments, the DS computing device is in communication with a payment network.

As used herein, "key value" is defined to be the data field(s) (i.e., column(s)) within a set (e.g., a table) upon which the select operation has optimal runtime. In some embodiments, all key values may be unique. In one embodiment, a database may build an index containing both the key values and a location reference to the full data record, and store this index in a volatile memory format having fast random read times. For optimal communication between two databases maintained by separate parties, the key values must be synchronized, allowing for efficient data access, and/or for information to be cross-referenced between parties. The information available based upon key value select operations, and/or join operations performed using key value matching between tables, may be known as key lookup data.

As used herein, "key lookup data" refers to a set of data records accessed using a key value, using database operations including, but not limited to, database select and/or join operations. Each data record contained within the key lookup data set contains at least one key value, and may contain any number of additional fields. In some embodiments, the key lookup data set may include data records sourced from multiple data providers and/or databases. Additionally or alternatively, the key lookup data may be a nonhomogeneous set, meaning the data records within the set may have differing fields. In one embodiment, where a payment card identifier serves as a key value, key lookup data includes, but is not limited to, cardholder contact information, payment transactions, updated payment card identifiers, and the like, associated with the payment card identifier.

As used herein, "stakeholder" refers to a party associated with a data record and/or a set of data records. In one embodiment, a stakeholder refers to a data provider associated with the data records, such that the data provider stores the records in a data source maintained by the data provider. Additionally or alternatively, a stakeholder refers to a party identified within a data record and/or in the key lookup data associated with a key value stored in the data record. In this embodiment, stakeholders may be identified by phone numbers, email addresses, names, and the like, as stored within the data record or key lookup data. In one embodiment, where a payment card identifier serves as a key value, the issuer of the payment card identifier may be a stakeholder. Additionally or alternatively, the cardholder may be a stakeholder, as identified by a name and phone number contained within key lookup data associated with the payment card identifier (i.e., key value).

As used herein, "data provider" refers to a party storing data records containing at least one key value simultaneously and independently stored in at least one data record held by a requesting party. In some embodiments, the data provider receives key value queries from the DS computing device and returns key lookup data. Additionally or alternatively, the data provider may transmit key lookup data to the DS computing device periodically and/or at any other time. In one example embodiment, data providers may include, but are not limited to, issuers (i.e., financial institutions) issuing payment cards. In some embodiments, issuers may serve as stakeholders and/or data providers.

As used herein, "requesting party" refers to a party storing data records containing at least one key value simultaneously and independently stored in at least one data record held by a data provider. Additionally or alternatively, "requesting party" may refer to any party transmitting update requests to the DS computing device. In one example embodiment, the requesting parties may include, but are not limited to, merchants processing payment card transactions. In the payment card industry, at least some payment transactions are performed in which a cardholder makes a purchase, but the physical payment card is not present for the merchant to inspect. These payment transactions are known as "card-not-present" (CNP) payment transactions, and include, for example, virtual or online payment transactions. In such payment transactions, payment card information, including a payment card identifier and, in many instances, an expiration date for the payment card is transmitted from a cardholder to a merchant. In some embodiments, requesting parties include merchants processing account-on-file card-not-present payment transactions.

An "account-on-file" transaction is a type of payment transaction in which the merchant stores information regarding the cardholder's payment card in a database, then retrieves the stored payment card information to generate a payment transaction. One specific type of account-on-file transaction is a "recurring payment transaction," which a merchant initiates on a recurring basis for a particular cardholder. In such recurring payment transactions, the merchant stores information regarding the cardholder's payment card in a database, then retrieves the stored payment card information and generates one or more recurring authorization request messages, which frequently correspond to billing intervals.

One example of a recurring payment transaction is a gym membership. Rather than mailing a monthly check for membership with a gym, a cardholder might choose to register a payment card (such as a credit card, a debit card, or a prepaid card) with the gym. Registering the payment card with the gym enables the gym to automatically charge the payment card for the monthly membership fees on a particular day each month. In some such systems, the merchant stores a payment card identifier, an expiration date, and/or other information associated with the payment card and/or cardholder.

Given the convenience of this payment model for both merchants and cardholders, there are many other scenarios in which a cardholder may be member of a club or subscriber of products or services. Accordingly, multiple merchants may have stored payment card information for the same cardholder. Likewise, any given merchant may have stored payment card information for multiple cardholders.

In addition to recurring payment transactions, merchants may also maintain account-on-file information to facilitate payment transactions by repeat customers. For example, an online merchant may allow a shopper to create an online account and store account data corresponding to one or more methods of payment (e.g., payment cards, digital wallets, etc.). When the shopper is ready to "check out" and complete a purchase, the shopper may simply select one of the stored payment methods, as opposed to having to re-enter their payment information.

To facilitate recurring payment transactions or account-on-file transactions, merchants may store payment card information, including payment card identifiers, in a data source, with the payment card identifier serving as a key value.

However, information associated with a payment card is subject to change. For example, a payment card might expire, causing a new payment card to be issued with an updated expiration date while the payment card number (or other payment card identifier) remains the same. In such instances, a payment transaction containing an authorization request message including the outdated expiration date may be denied by the issuer of the payment card. As a result, the merchant that originally submitted the payment transaction (e.g., the recurring and/or account-on-file payment transaction) is prevented from successfully obtaining payment unless the merchant acquires the updated expiration date for the payment card. It may be difficult and time consuming for a cardholder to update each merchant with new payment card information. Likewise, it reduces the benefits (e.g. convenience) of the account-on-file payment model to require a merchant to inquire with each cardholder for updated payment card information prior to submitting each payment authorization request. Thus, a merchant may submit an update request for key lookup data (e.g., updated payment card identifiers and/or expiration dates) to the DS computing device.

As described further herein, the DS computing device may be configured to retrieve information associated with such transactions processed by the payment network (i.e., key lookup data). The authorization messages may contain payment card numbers (i.e. key values), merchant identifiers, authorization status, and payment transaction amounts. The DS computing device may be further configured to filter the received authorization messages, based on factors including, but not limited to, payment card number, associated cardholder, and associated merchant. Additionally or alternatively, the DS computing device may be configured to query the payment network for authorization messages related to a specific cardholder, merchant, issuer, and the like.

The DS computing device is configured to access a queue of requests for updated information. Each request contains information including, but not limited to, one or more requesting party identifiers, key values, and/or key lookup data. In one embodiment, the key value may be a payment card identifier, such that the update request represents a request for updated payment card information, including, for example, payment card identifiers and expiration dates associated with a payment card. The requesting party may therefore include a merchant processing payment card transactions. The update request may be transmitted to the DS computing device by a requesting party, and the DS computing device stores the update requests in the queue for processing.

Additionally or alternatively, the DS computing device may be configured to generate update requests on behalf of the requesting party. In one embodiment, the DS computing device may generate an update request whenever the DS computing device receives key lookup data for a data record from a data provider. More particularly the DS computing device may generate an update request when the DS computing device receives an updated payment card identifier and/or expiration date, for example, from an issuer.

Additionally or alternatively, the DS computing device may query data providers for key lookup data. For example, the DS computing device may generate a new update request based on a previously processed update request from a requesting party, when additional updated key value information associated with the same data record and/or stakeholder becomes available.

In another embodiment, the DS computing device may periodically analyze information contained in transaction messages available to the DS computing device, and generate update requests based on the transaction messages. Transaction messages contain at least one key value. For example, the DS computing device may determine that, for a specific transaction message where a payment was declined by an issuer, an updated payment card identifier is available. The DS computing device may then generate an update request on behalf of the merchant associated with the transaction message, for the updated payment card information.

The DS computing device is configured to manage synchronization of data included in the update request between a data provider and the requesting party. Accordingly, The DS computing device may be further configured to identify one or more requesting parties, data providers, and/or stakeholders associated with the update request. In one example embodiment, the DS computing device identifies one or more merchants, issues, and/or cardholders associated with the update request.

The DS computing device is configured to determine whether, for a specific update request, corresponding key lookup data is available for at least one key value identified in the update request. The DS computing device is configured to query data sources with key values, retrieving key lookup data. In one embodiment, the DS computing device queries a database containing payment card information. For example, the DS computing device may query a data provider computer system with a payment card identifier (i.e., a key value) to determine if an updated expiration date (i.e., key lookup data) is available.

The DS computing device is further configured to determine whether to generate a release request, based on identified key lookup data and/or stakeholders. The DS computing device may make such a determination by analyzing key lookup data. In one embodiment, key lookup data includes, but is not limited to, payment transaction(s) associated with the requesting party, payment transaction(s) associated with the payment card, payment transaction frequency, data provider preferences and/or the status of any previous release requests associated with the payment card and/or requesting party. For example, in one embodiment, the DS computing device may determine that, for a merchant and payment card identified in an update request, there exist no previously approved transaction messages (i.e., key lookup data) between the merchant and the payment card. In this case, the DS computing device may conclude a release request is necessary. As another example, the DS computing device may determine that for a specific update request from a requesting party for a specific payment card, there exists a payment transaction between this requesting party and payment card within a threshold amount of time before the update request. In this case, the DS computing device may conclude that a release request is not necessary.

If the DS computing device determines that a release request is necessary, then the DS computing device will generate a release request. The release request may include one or more key values and/or key lookup data. The release request may further include a generation time and/or deadline time, and/or a requesting party identifier. The request deadline time indicates when the DS computing device will consider the release request expired, and continue processing. The request generation time and deadline time may be used by a stakeholder mobile device to generate reminder notifications.

In some embodiments, the release request is transmitted to the stakeholder associated with the key lookup data electronically, such as through an email, Application Program Interface (API) call (e.g., through a mobile application), short message service (SMS), or other electronic messaging format. For example, in one embodiment, the DS computing device may transmit an API call to a stakeholder application installed on a mobile device. In another example, the DS computing device may act as a web server to host a website, which the stakeholder operates to access the release request (e.g., using a user computing device such as a laptop or smartphone).

The DS computing device may be further configured to stagger transmission of and/or combine release requests before transmission. In one embodiment, the DS computing device staggers the transmission of release requests based on one or more key value(s) included in the release request. For example, in one embodiment, the DS computing device may stagger transmission of release requests based upon an issuer identification number (IIN) contained within a payment card identifier. The IIN, as the name suggests, identifies the issuer of the payment card. For example, the DS computing device may stagger release requests containing an IIN number within a certain range, indicating a common data provider, thereby increasing transmission efficiency. In another embodiment, related release requests may be combined into one transmission by the DS computing device based on information contained in the release request, including, but not limited to, key lookup data, stakeholders, and/or requesting parties. For example, the DS computing device may determine that several release requests are associated with the same stakeholder and therefore are related, and the DS computing device may combine the requests for transmission to that stakeholder. As another example, the DS computing device may combine release requests with matching or similar requesting party identifiers, before transmitting a combined release request, increasing transmission efficiency. Combined release requests may be responded to as a whole, or individual responses may be generated.

The DS computing device is further configured to receive update release responses, indicating that a release request has been either authorized or declined. In certain embodiments, the update release responses may be associated with a combined release request and/or with multiple individual release requests and may indicate a plurality of release requests have been authorized or declined. For example, an update release response may indicate that all release requests associated with a requesting party identified in the response have been declined. In some embodiments, the update release response is received by the DS computing device electronically, such as through an email, API call, short message service (SMS), or other electronic messaging formats. For example, in one embodiment, the DS computing device may receive the update release response as an API call from a stakeholder banking application on a mobile device. In another example, the DS computing device may act as a web server to host a website, which the stakeholder operates to transmit the update release response (e.g., using a user computing device).

The DS computing device is configured to determine if authentication of a release response is required. In some embodiments "authenticating" the release request refers to determining whether the release request was generated by an authorized party, including, but not limited to, the stakeholders associated with the release request. In some embodiments, the stakeholder(s) associated with a release request include the payment card issuer and/or the cardholder associated with the payment card. The DS computing device determines whether to authenticate the release request by analyzing key lookup data associated with the release request and/or the update request. In some embodiments, key lookup data includes but is not limited to, payment transaction frequency, stakeholder preferences, the data provider associated with the payment card, payment transaction history associated with the payment card, and/or the requesting party and/or the stakeholder associated with the release request. The DS computing device may perform authentication by issuing an authentication challenge. For example, the DS computing device may determine to generate an authentication challenge related to release response in which the cardholder authorized the release of updated payment card information to a merchant having a payment transaction volume below a certain threshold. As another example, a stakeholder who responded successfully to an authentication challenge may not be transmitted further authentication challenges within the next 24 hours. If the DS computing device determines that authentication of the release response is not necessary, an authentication challenge will not be generated, and the DS computing device may proceed to generating and transmitting an update response.

The DS computing device may be further configured to generate the authentication challenge(s). The authentication challenge(s) may include, for example, password, biometric, and/or token challenges. The DS computing device may be further configured to determine which challenges are applicable to a particular stakeholder, based on stakeholder authentication information available to the DS computing device. In general, the DS computing device generates and transmits an authentication challenge to the stakeholder, receives an authentication response, and verifies the response. In one embodiment, the DS computing device may generate authentication challenges that include a minimum of two factors.

The DS computing device may be configured to transmit authentication challenges using a variety of electronic communication formats, including but not limited to, Hypertext Transfer Protocol (HTTP), API calls, WebSocket connections, SMS messages, and email. The DS computing device may encrypt the authentication challenge using a method appropriate for the particular electronic communication means. For example, HTTP packets may be encrypted using Transport Layer Security (TLS). The DS computing device may be further configured to send authentication challenges using a physical format, such as postal mail, courier services, and the like. The DS computing device may be further configured to receive authentication responses from stakeholders using any of the above communication formats. In some embodiments, the authentication response may be additionally be encrypted.

For example, in one embodiment, the DS computing device transmits an authentication challenge to a stakeholder as a SMS message to the stakeholder's mobile device, requesting a Personal Identification Number (PIN) and a unique One-Time-Password (OTP) from the stakeholder. The requested PIN may have been previously selected by or assigned the stakeholder. In this example, the OTP is generated (e.g., by the DS computing device) at the time of the authentication challenge, and is used for authentication only once. The OTP may be transmitted to the stakeholder by the DS computing device using an alternative communication format, for example, as an email to the stakeholder's email address. The stakeholder may provide their PIN and the OTP in an authentication response. The stakeholder may transmit the authentication response to the DS computing device by operating their stakeholder mobile device. The authentication response may be formatted, for example, as an SMS message.

As another example, in another embodiment, the DS computing device transmits an authentication challenge to a stakeholder as an API call to a mobile application on the stakeholder's mobile device, and wherein the API call causes a push notification to the stakeholder's mobile device. The authentication challenge may include fingerprint and password authentication challenges. The stakeholder may provide their password and a digital representation of their fingerprint in an authentication response. The authentication response may be formatted, for example, as an encrypted HTTP packet.

The DS computing device may be configured to verify authentication responses, by comparing the authentication response to stakeholder authentication information available to the DS computing device. For example, the DS computing device may access stakeholder information at a database and compare the authentication response thereto. For example, the DS computing device may query a data provider (e.g., an issuer) for key lookup information, including, but not limited to, stakeholder contact information and/or transaction messages. The DS computing device may be further configured to verify authentication responses by assessing metadata in the authentication response, including a time the authentication response is generated, an Internet Protocol (IP) address of the device from which the authentication response is received, type of device that generated the authentication response, and the like. For example, the DS computing device may reject an authentication response received at 2 AM, in the time local to a cardholder, if previous authentication responses (and/or other communications) were received only during local daylight hours. As another example, the DS computing device may reject an authentication response received from a European IP address if previous authentication responses were received from one or more United States IP addresses.

The DS computing device is configured to determine if an update response to the original update request is to be generated and transmitted. The DS computing device makes such a determination by analyzing information including, but not limited to, whether a release request was generated, received update release responses, received authentication responses, data provider/stakeholder preferences, and/or verification status of received authentication responses. The DS computing device may further analyze the information used to determine if a release request was to be generated, including key lookup data such as payment transaction history, payment card information, and/or requesting party associated with the original update request. For example, the DS computing device may generate an update response after an authentication response from a stakeholder associated with a payment card having updated payment card information is verified by the DS computing device. As another example, the DS computing device may generate an update response after an update release response was received by the DS computing device in cases where an authentication challenge was not issued.

The DS computing device is further configured to generate the update responses. The DS computing device may generate update responses by identifying the updated key value(s) and/or key lookup data associated with the key value in the update request information being requested, and formatting the key lookup data for transmission. Update responses may further include one or more requesting party identifier(s), and/or outdated key values corresponding to any updated key values. The DS computing device is configured to transmit the update response(s) to the requesting party. The DS may be configured to transmit update responses using a variety of communication formats, including both electronic and physical formats, such as API calls, SMS messages, and email.

Additionally or alternatively, in certain embodiments, a data provider (e.g., an issuer) may perform certain steps usually performed by the DS computing device. For example, in one embodiment, the DS computing device may transmit release requests to an issuer, which then transmits any release requests to cardholders, using cardholder contact information available to the issuer. The issuer may then transmit update release responses back to the DS computing device. In another embodiment, authentication challenges may be generated by the issuer, authentication responses may be verified by the issuer, and/or the issuer may transmit an authentication status to the DS computing device. In general, in some embodiments, the issuer may act on behalf of the cardholder.

In certain embodiments, the DS computing device may be configured to transmit release requests that indicate a response is not required and may continue to determine if an update response should be generated. For example, the DS computing device may transmit a release request indicating a response is not required, but the release request still contains information such as a payment card identifier and requesting party identifier. In this example, the release request serves as a notification to the stakeholder.

The methods and systems described herein may be implemented using computer programming or engineering techniques including computer software, firmware, hardware or any combination or subset thereof, wherein the technical effect is achieved by performing at least one of: (a) retrieving an update request from a queue, the update request including a key value and a requesting party identifier, the key value identifying at least one respective data record; (b) identifying key lookup data associated with the update request by performing one or more database operations on one or more data sources, the key lookup data including one or more updated data record elements; (c) determining whether a release is needed from at least one stakeholder associated with the key value; (d) when the release is needed, transmitting a release request to the stakeholder, the release request including the key value and the requesting party identifier; (e) receiving a release response from the stakeholder, the release response indicating that the release has been authorized; and (f) transmitting an update response to the requesting party, the update response including the key lookup data.

The systems and methods described herein provide the technical advantages of (a) reducing the likelihood that payment card information will be released erroneously, thereby reducing payment card fraud; (b) reducing the likelihood that payment card information will be released against the stakeholder's preferences, thereby reducing payment transaction disputes; (c) allowing the stakeholder to monitor requesting parties storing their information (e.g., payment card information); (d) allow stakeholders to selectively release updated billing information, thereby reducing declined payment transactions and the need for personally updating billing information after being issued updated payment card information; (e) ensuring accurate data record correlation (e.g., join operations) between tables and/or databases; (f) ensuring accurate data record access (e.g., select operations); (g) facilitating consistent runtime of data record access; (h) improved stakeholder control over data security of data records; (i) reducing manual billing information updating; and (j) improving network efficiency and network bandwidth by reducing needless decline messages and subsequent re-submission of authorization messages.

In the example implementation, any information stored on the DS computing device does not include any personally identifiable information (PII), but rather includes analyzed, anonymized, and/or aggregated data that does not specifically identify a consumer. In other implementations, where the DS computing device may store PII, any stored PII is encrypted and/or otherwise secured. Moreover, in any implementations in which PII may be collected, the consumer from which the PII may be collected is provided an opportunity to agree to or deny collection of such data.

FIG. 1 is a simplified block diagram of an example data synchronization (DS) system 100 used for synchronously authorizing the release of stored key values and key lookup data in accordance with one example embodiment of the present disclosure. In the example embodiment, DS system 100 may be used for authorizing the release of stored key values and key lookup data to requesting parties (e.g., merchants). In the illustrated embodiment DS system 100 includes a DS computing device 116 configured to authorize the release of key lookup data, including updated key values. As described below in more detail, DS computing device 116 is configured to receive update requests, identify potential updates, determine if an update release is needed from the stakeholder(s), generate and transmit an release request, receive an update release response, authenticate the received update release response, determine if updated key values and key lookup data will be released to the requesting party, and/or generate and transmit a payment card information update to the requesting party.

In the example embodiment, DS computing device 116 is in communication with a first requesting party computer system 102 and a second requesting party computer system 104. First requesting party computer system 102 and second requesting party computer system 104 are computers that include a web browser or a software application, which enables first and second requesting party computer systems 104 and 106 to be in communication with DS computing device 116 using a network 130. Network 130 may be accessible through interfaces including, but not limited to, the Internet, a local area network (LAN), a wide area network (WAN), or an integrated services digital network (ISDN), a dial-up-connection, a digital subscriber line (DSL), a cellular phone connection, and a cable modem. First and second requesting party computer system 102 and 104 can be any device capable of accessing the Internet and/or network 130 including, but not limited to, a desktop computer, a laptop computer, a personal digital assistant (PDA), a cellular phone, a smartphone, a tablet, a phablet, a server computer device, or other web-based connectable equipment.

In the example embodiment, first and second requesting party computer systems 102 and 104 each may transmit update requests to DS computing device 116. Additionally, first and second requesting party computer systems 102 and 104 may receive update responses from DS computing device 116. In some embodiments, first and second requesting party computer 102 and 104 are associated with merchants, and may be engaged in ecommerce and/or processing recurring payment card transactions. In some embodiments, first and second requesting party computer systems 102 and 104 act as point-of-sale systems and may be, but are not limited to computing devices that accept card swipes, online payment portals, or stored payment card numbers for recurring payment transactions.

A database server 128 is communicatively coupled to a database 114 that stores data. In one embodiment, database 114 stores data records containing key value(s), such as a payment card identifier (PCI), and key lookup data. For example, in one embodiment, database 114 stores key lookup data including, but not limited to, outdated PCIs, outdated expiration dates associated with the outdated PCIs, updated PCIs, updated expiration dates, authentication responses, release request responses, and updated responses. Database 114 may further contain contact information for stakeholders associated with key values, such as phone numbers, email addresses, and mailing addresses. In the example embodiment, database 114 is stored remotely from DS computing device 116. In some embodiments, database 114 is decentralized. In other embodiments, DS computing device 116 includes database 114.

DS computing device 116 is further communicatively coupled with first and second stakeholder mobile devices 110 and 112. First and second stakeholder mobile devices 110 and 112 are each associated with a respective stakeholder (not shown), who is associated with at least one data record. In the example embodiment, first and second stakeholder mobile devices 110 and 112 are computers that include a web browser, messaging application, or other software application, which enables first and second stakeholder mobile devices 110 and 112 to be in communication with DS computing device 116. More specifically, stakeholder mobile devices 110 and 112 are communicatively coupled using network 130. Cardholder mobile devices 110 and 112 may be any device capable of accessing the Internet and/or network 130 including, but not limited to, a desktop computer, a laptop computer, a personal digital assistant (PDA), a cellular phone, a smartphone, a tablet, a smartwatch, a phablet, or other web-based connectable equipment. Additionally or alternatively, first and second stakeholder mobile devices 110 and 112 may be in communication with DS computing device 116 using a telephone network.

In the example embodiment, first and second stakeholder mobile devices 110 and 112 may receive release requests from DS computing device 116, and may transmit release responses to DS computing device 116. Additionally, first and second stakeholder mobile devices 110 and 112 may receive authentication challenges from DS computing device 116, and may transmit authentication responses to DS computing device 116. In some embodiments, first and second stakeholder mobile devices 110 and 112 are communicatively coupled with DS computing device 116 through a data provider computer system 106. In other embodiments, first and second stakeholder mobile devices 110 and 112 are communicatively coupled to DS computing device 116 through network 130.

DS computing device 116 is communicatively coupled to at least one data provider computer system 106. In one example embodiment, data provider computer system 106 is associated with a payment card issuer. In one example embodiment, data provider computer system 106 may store stakeholder contact information. In some embodiments, data provider computer system 106 is communicatively coupled to DS computing device 116 through a payment network. Data provider computer system 106 is a computer that includes a web browser, or software application, which enables data provider computer system 106 to be in communication with DS computing device 116. More specifically, data provider computer system 106 is may be communicatively coupled to DS computing device 116 though network 130.

Data provider computer system 106 may further act as a data source when communicatively coupled to DS computing device 116. For example, data provider computer system 106 may include a source database configured to store key lookup data including, but not limited to, stakeholder contact information, payment card numbers (PCNs), stakeholders authorized to use payment cards, payment transactions, payment card expiration dates, and/or stakeholder authentication information.

Figure 2:
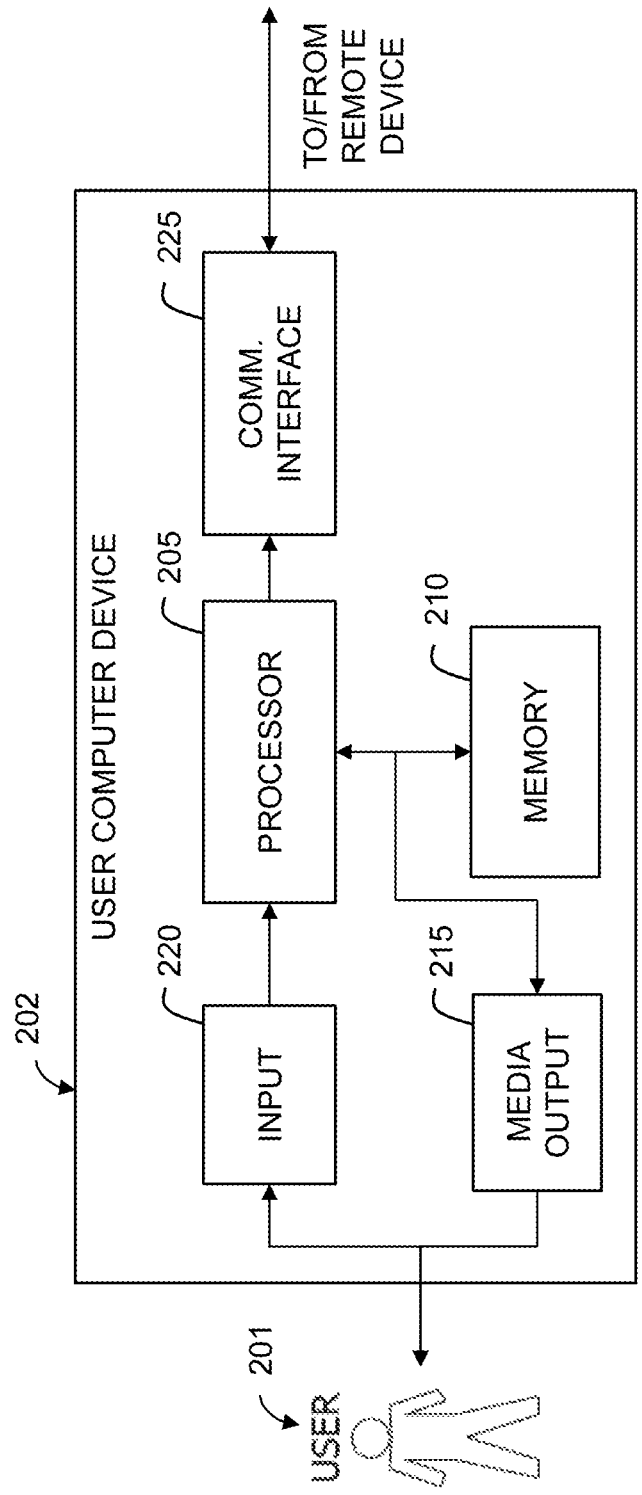

FIG. 2 illustrates an example configuration of user computing device 202 that may be used in DS system 100 (shown in FIG. 1), in accordance with one embodiment of the present disclosure. User computer device 202 is operated by a user 201. User computer device 202 may include, but is not limited to, first requesting party computer system 102, second requesting party computer system 104, first stakeholder mobile device 110, second stakeholder mobile device 112, and/or data provider computer system 106 (all shown in FIG. 1). User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or payment transaction data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter (not shown) such as a video adapter and/or an audio adapter. An output adapter is operatively coupled to processor 205 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 215 is configured to present a graphical user interface (e.g., a web browser and/or a client application) to user 201. A graphical user interface may include, for example, an online store interface for viewing and/or purchasing items, and/or a wallet application for managing payment card information. In some embodiments, user computer device 202 includes an input device 220 for receiving input from user 201. User 201 may use input device 220 to, without limitation, select and/or enter one or more items to purchase and/or a purchase request, or to access credential information, and/or payment card information. Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

User computer device 202 may also include a communication interface 225, communicatively coupled to a remote device such as DS computing device 116 (shown in FIG. 1). Communication interface 225 may include, for example, a wired or wireless network adapter and/or a wireless data transceiver for use with a mobile telecommunications network.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website from DS computing device 116. A client application allows user 201 to interact with, for example, DS computing device 116. For example, instructions may be stored by a cloud service, and the output of the execution of the instructions sent to the media output component 215.

Processor 205 executes computer-executable instructions for implementing aspects of the disclosure. In some embodiments, the processor 205 is transformed into a special purpose microprocessor by executing computer-executable instructions or by otherwise being programmed.

Figure 3:
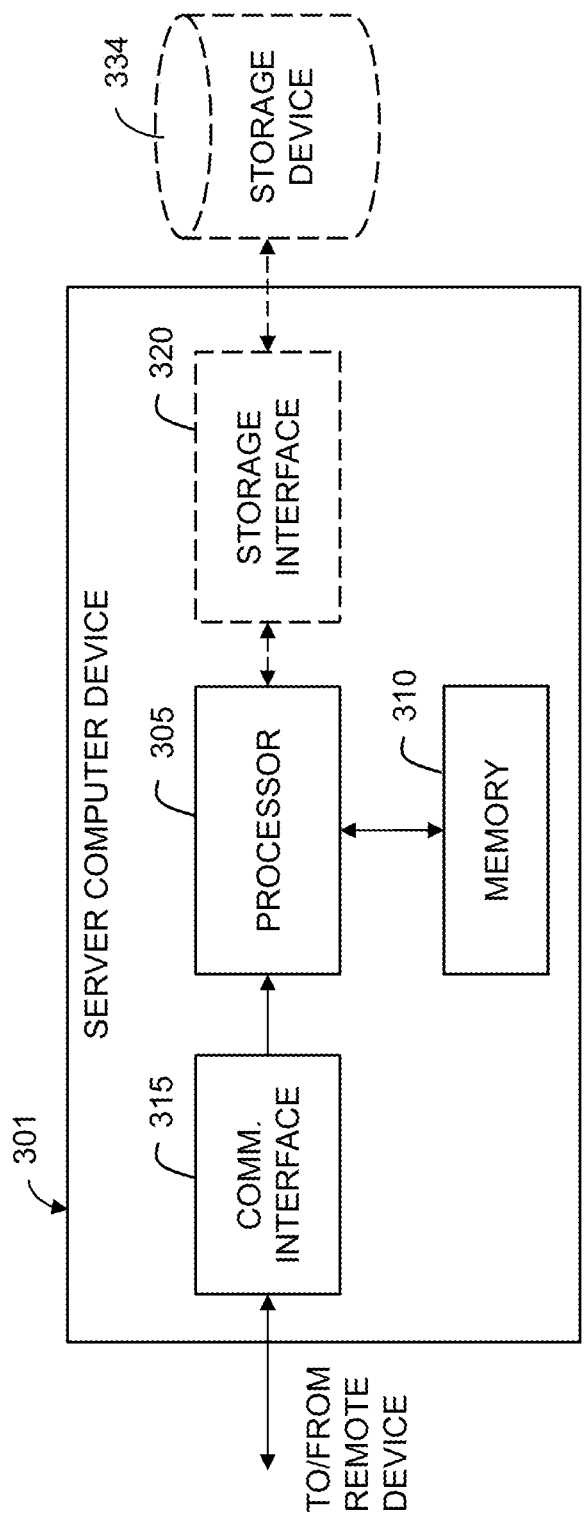

FIG. 3 illustrates an example configuration of a server computer device 301 that may be used in DS system 100 (shown in FIG. 1). Server computer device 301 may include, but is not limited to, first requesting party computer system 102, second requesting party computer system 104, database server 114, DS computing device 116, and data provider computer system 106 (all shown in FIG. 1). Server computer device 301 also includes a processor 305 for executing instructions. Instructions may be stored in a memory area 310. Processor 305 may include one or more processing units (e.g., in a multi-core configuration).

Processor 305 is operatively coupled to a communication interface 315 such that server computer device 301 is capable of communicating with a remote device such as another server computer device 301, or user computer devices 202 (shown in FIG. 2). For example, communication interface 315 may receive requests from data provider computer system 106, via network 130 and/or the Internet, as illustrated in FIG. 1.

Processor 305 may also be operatively coupled to a storage device 334. Storage device 334 is any computer-operated hardware suitable for storing and/or retrieving data, such as, but not limited to, data associated with database 114 (shown in FIG. 1). In some embodiments, storage device 334 is integrated in server computer device 301. For example, server computer device 301 may include one or more hard disk drives as storage device 334. In other embodiments, storage device 334 is external to server computer device 301 and may be accessed by a plurality of server computer devices 301. For example, storage device 334 may include a storage area network (SAN), a network attached storage (NAS) system, and/or multiple storage units such as hard disks and/or solid state disks in a redundant array of inexpensive disks (RAID) configuration.

In some embodiments, processor 305 is operatively coupled to storage device 334 via a storage interface 320. Storage interface 320 is any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Processor 305 executes computer-executable instructions for implementing aspects of the disclosure. In some embodiments, the processor 350 is transformed into a special purpose microprocessor by executing computer-executable instructions or by otherwise being programmed. For example, the processor 305 is programmed with the instruction such as illustrated in FIG. 4.

Figure 4:
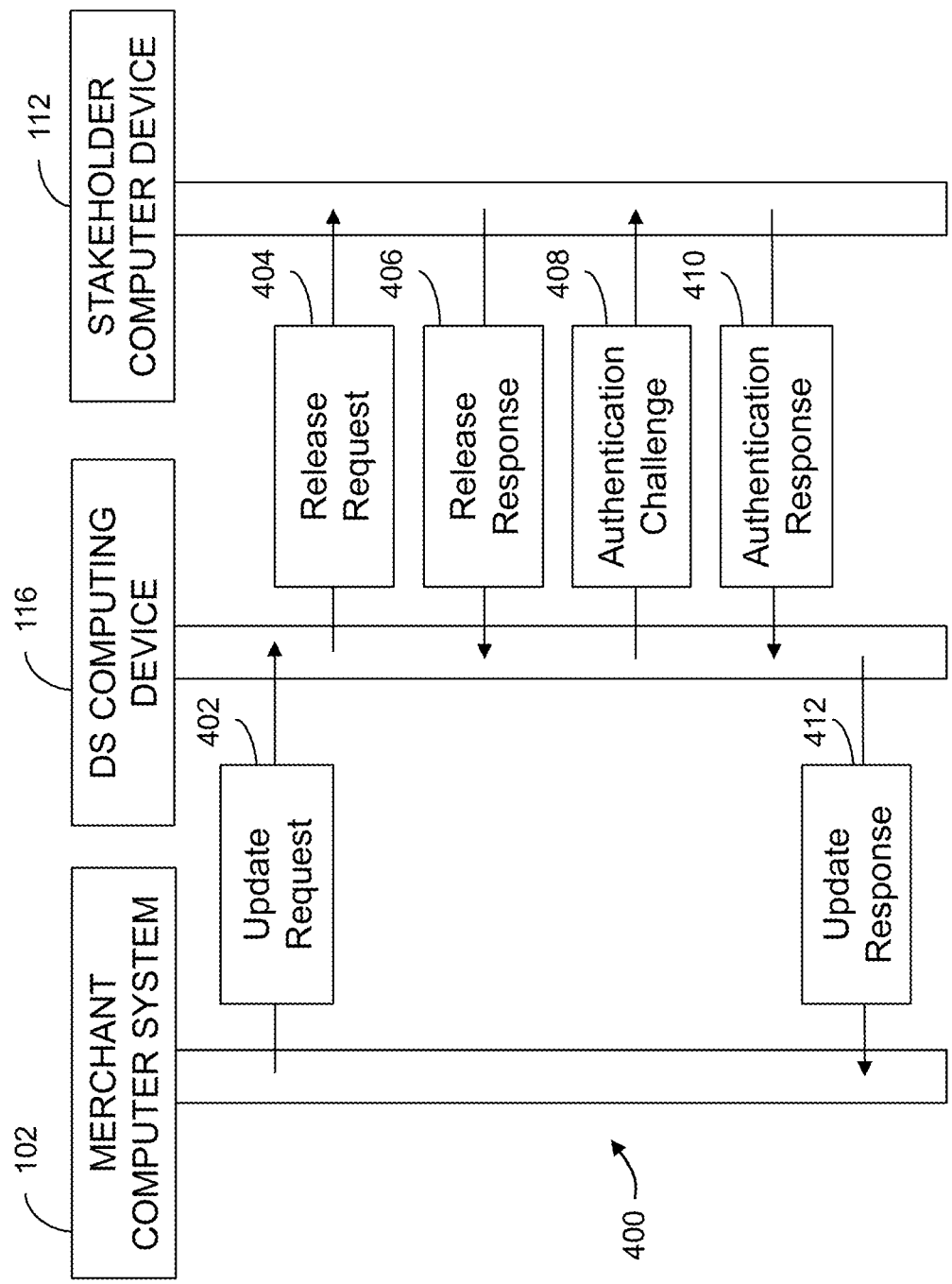

FIG. 4 is a message flowchart 400 of an example data release process implemented using DS system 100 (shown in FIG. 1). In the illustrated embodiment, a requesting party includes first requesting party computer system 102 (also shown in FIG. 1), more particularly, a merchant computer system 102. Merchant computer system 102 submits an update request 402 to DS computing device 116. Update request 402 may contain, for example and without limitation, requesting party identifying information and/or key values (e.g., one or more payment card identifiers). Additionally, update request 402 may include key lookup data. In some embodiments, key lookup data includes: expiration dates and payment transaction messages or identifiers thereof. For example, for merchant computer system 102, update request 402 may include declined payment transaction messages, and a payment card identifier (i.e., key value) used in the declined payment transactions.

DS computing device 116 submits a release request 404 to stakeholder computer device 112. Release request 404 may contain, but is not limited to, stakeholder contact information, key values, key lookup data, and requesting party identifying information. For example, release request 404 may contain a payment card identifier (key value), merchant (requesting party) identifying information, and payment card transaction messages (key lookup data).

DS computing device 116 receives release response 406 from stakeholder computer device 112. Release response 406 may contain, but are not limited to, outdated key values, updated key values, requesting party identifying information, and at least one flag indicating if a specific release request 404 associated with a key value has been approved for release to a specific requesting party (e.g., merchant computer system 102). In some embodiments, release response 406 may contain multiple flags, indicating that multiple release requests 402 associated each associated with key values have been approved or denied.

DS computing device 116 may transmit an authentication challenge 408 to stakeholder computer device 112. Authentication challenge 408 may contain, but is not limited to, stakeholder contact information, delivery information, contextual information regarding authentication challenge 408, and a request for authentication information. The contextual information may help the receiving party (e.g., the stakeholder) understand what data is being requested of them for verification purposes.

DS computing device 116 receives authentication response 410 from stakeholder computer device 112. Authentication response 410 may contain, but is not limited to, contextual information regarding authentication challenge 408, metadata, and response data. The authentication response metadata may contain information such as response generation time, device type, and location information associated with stakeholder computer device 112. In some embodiments, authentication response 410 is provided in a format specified by authentication challenge 408.

DS computing device 116 also generates an update response 412, and transmits update response 412 to merchant computer system 102. Update response 412 may contain, but is not limited to, outdated key values for reference (e.g., a payment card number), key lookup data (e.g., a payment card expiration date, an updated payment card number), data provider identifier(s), and a flag indicating if update response 412 was authorized (e.g., released) by a stakeholder.

Figure 5:
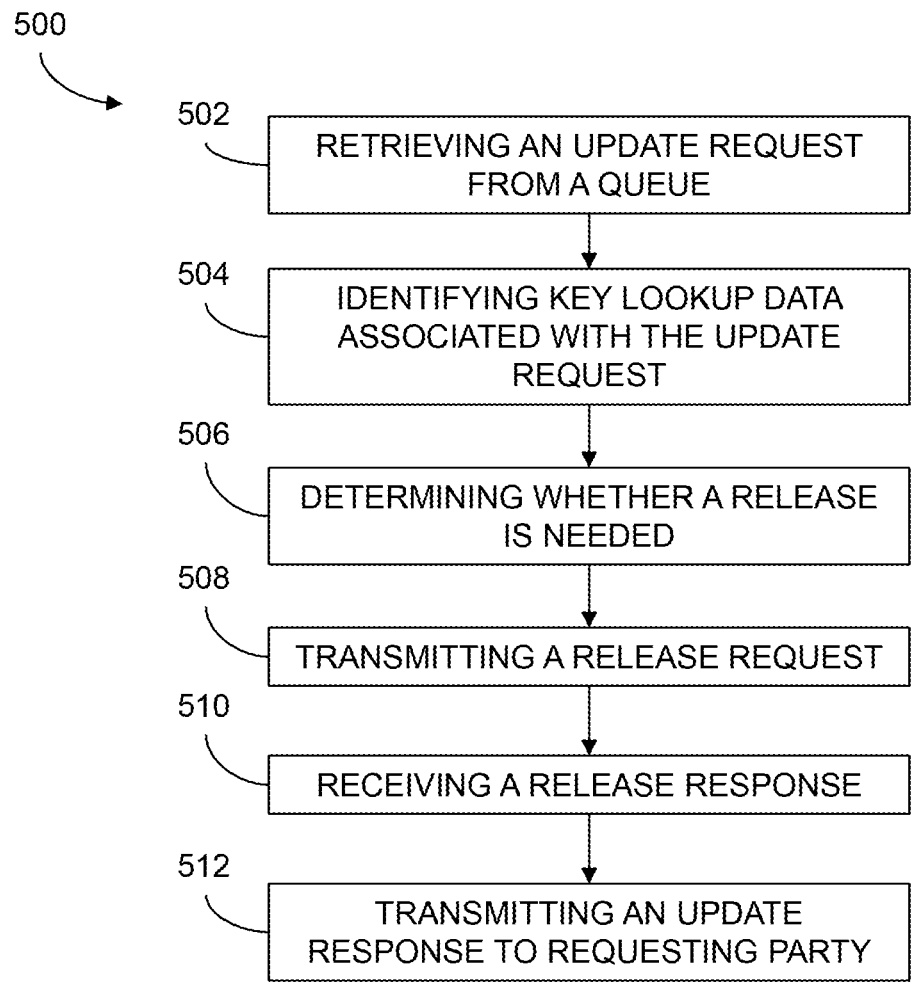

FIG. 5 is a flowchart illustrating an example of a process 500 for managing the synchronization of key values and key lookup data using DS system 100 (shown in FIG. 1), in accordance with one embodiment of the disclosure. Process 500 may be implemented by a computing device, for example, DS computing device 116 (also shown in FIG. 1).

In one example embodiment, a requesting party (e.g., first requesting party computer system 102 or second requesting party computer system 104, both shown in FIG. 1.) stores key values and key lookup data for future processing. In one embodiment, the requesting party may be a merchant storing payment card identifiers. For example, payment card identifiers (key values) and payment card expiration dates (key lookup data) may be stored, and used for ecommerce payment transactions.

When the requesting party needs updated key values and/or key lookup data to keep their stored information accurate and up-to-date (e.g., to avoid payment card declines) the requesting party may send update requests to the DS computing device 116. These requests may be transmitted periodically, and/or at any other time selected by the requesting party. For example, the requesting party may send update requests to the DS computing device 116 when it generates transaction messages include a payment card number, a key value.

Stored key values and/or key lookup data may need to be updated when: (1) the expiration date associated with the payment card identifier needs to be updated, such as when the expiration date has passed; and (2) the payment card identifier (PCI) needs to be updated, such as when the PCI has been compromised from fraudulent activities.

Process 500 includes retrieving 502 an update request from a queue, the update request including a key value and a requesting party identifier. The key value identifies at least one respective data record. Update requests stored in the queue include update requests received from requesting parties as described herein.

Process 500 also includes identifying 504 key lookup data associated with the update request by performing one or more database operations (e.g., select operations, join operations) on one or more data sources. The key lookup data includes one or more updated data record elements. In one example embodiment, the DS computing device identifies one or more merchants, issues, and/or cardholders associated with the update request. Identifying 504 may include querying data provider computer system 106 and/or database 114 for key lookup data using a key value included in the update request. Updates may be available, for example, when: (1) querying a data source (e.g., database 114) with a key value returns any updated key lookup data; (2) querying an issuer (e.g., data provider computer system 106) with a PCI, returns an updated PCI issued by the data provider to replace the PCI included in the update request, for example, if a PCI is cancelled and a new PCI is generated by the data provider due to fraud; (3) querying an issuer with a PCI returns a payment transaction with a matching PCI but an expiration date other than the expiration date included in the update request.

Process 500 also includes determining 506 whether a release is needed from at least one stakeholder associated with the key value and, when the release is needed, transmitting 508 a release request to the stakeholder, the release request including the key value and the requesting party identifier.

In some embodiments, the requesting party identifier, payment card information, and payment transactions identified in step 504 may be further used to determine if a release request is necessary, in step 506. Additionally or alternatively, DS computing device 116 may make further queries to data provider computer system 106 to determine key lookup data. In one embodiment key lookup data includes, but is not limited to, payment transaction history, and payment card information history. Further, DS computing device 116 may query database 114 for update requests and/or update responses associated with the current update request, for example, update responses may be retrieved having the same requesting party identifier, or update requests may be received having the same key value.

A release request may not be necessary when, for example: (1) querying a data source (e.g., database 114) with a key value returns a previous update response where the stakeholder previously authorized the release of updated key value and/or key lookup data to the requesting party; or (2) payment transactions stored in a data source (e.g., database 114), or received in response to a query to an issuer (e.g., data provider computer system 106), reveal multiple payment transactions sharing the PCI included in the update request and the requesting party associated with the request.

A release request may be necessary when, for example: (1) querying a data source (e.g., database 114) with a key value returns an update response where the stakeholder has recently declined an update request; or (2) querying an issuer (e.g., data provider computer system 106) with a PCI included in an update request returns an indication that the PCI has been associated with identity theft.

DS computing device 116 also transmits 508 release requests to a stakeholder. In some embodiments, DS computing device 116 transmits the release request to a data provider (e.g., an issuer) associated with the stakeholder. In some of these embodiments, a data provider associated with the stakeholder may act on the stakeholder's behalf and/or forward the release request to the stakeholder. In other embodiments, DS computing device 116 transmits the release request directly to the stakeholder computer device, such as first stakeholder computing device 112.

Process 500 still further includes receiving 510 a release response from the stakeholder. Release responses are associated with at least one release request, and indicate if a specific release request has been authorized or declined. In some embodiments, the release response contains an individual response to a plurality of potential updates available to requesting parties. In some embodiments, release responses may be received from one or more stakeholders. In some other embodiments, release responses may be received from a data provider (e.g., an issuer) associated with a stakeholder, who may be acting on the stakeholder's behalf.

Process 500 includes transmitting 512 an update response to the requesting party, the update response including the key lookup data. In some embodiments, the update response is transmitted 512 to a data provider (e.g., data provider computer system 106), such as a financial institution, associated with the requesting party. In some of these embodiments, the data provider may be storing key values and/or key lookup data (e.g., payment card information) for the identified requesting party. In other embodiments, the update response may be transmitted to directly to a requesting party (e.g., first requesting party computer system 102).

Upon receiving the update response, the system storing the key values and/or key lookup data may search through the stored data to find the key values and key lookup data included within the update response. Once the system finds a stored key value (e.g., a payment card identifier) matching a key value listed in the update response, the system may updates the stored key value. Additionally or alternatively, stored/outdated key lookup data (e.g., a payment card expiration date) may be updated, using the key lookup data contained in the update response. The system may continue to check each data element in the key lookup data in the update response against stored data elements until any outdated data elements have been updated.

Figure 6:
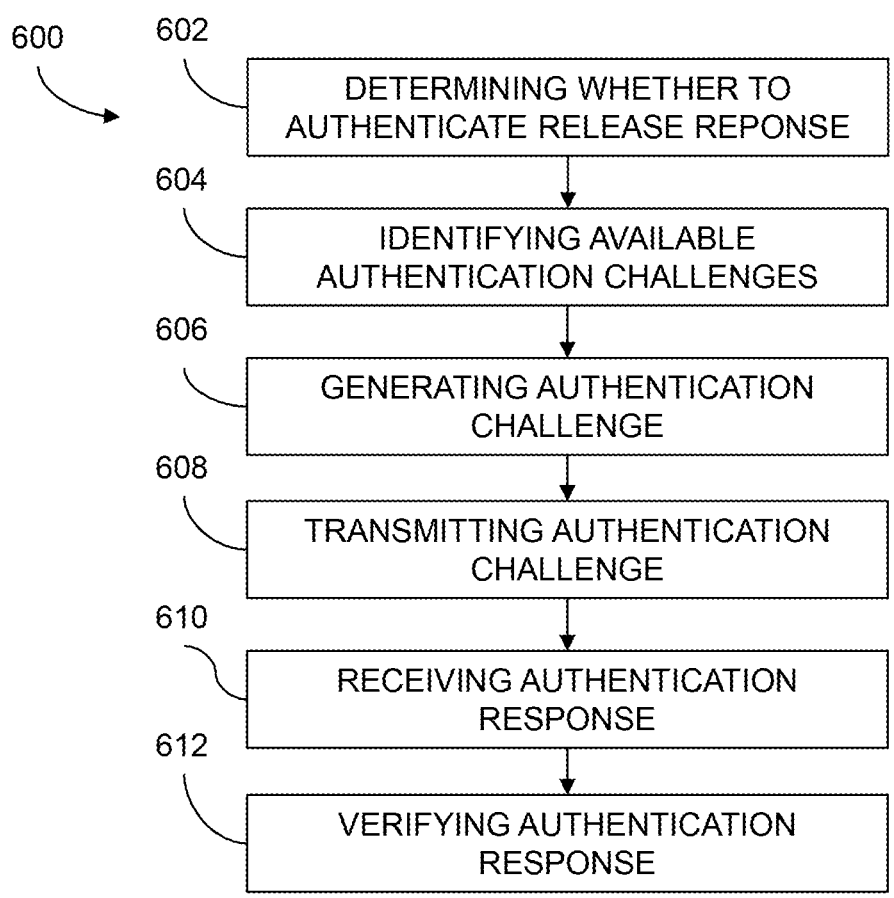

FIG. 6 illustrates a process 600 for authenticating a release response. Process 600 may be performed during and/or in conjunction with process 500 (shown in FIG. 5). Process 600 may be implemented using one or more components of DS system 100, such as DS computing device 116 and/or data provider computer system 106 (all shown in FIG. 1).

In this embodiment, "authenticating" release responses refers to confirming that the release request was generated by an authorized party, including, but not limited to, the stakeholder associated with the release request. Release responses may be authenticated by presenting and verifying authentication challenges. Additionally or alternatively, release responses may be authenticated by analyzing information including, but not limited to, metadata from the release response, stakeholder device history available from data provider computer system 106, and/or stakeholder update response history available from database 114 (both shown in FIG. 1).

Process 600 includes determining 602 whether to authenticate a release response and identifying 604 available authentication challenges. DS computing device 116 may query data provider computer system 106, and/or database 114 for stakeholder authentication information and/or contact information. Additionally or alternatively, DS computing device 116 may identify 604 available authentication challenges using metadata from a received release request response, such as a device type of a stakeholder computing device and/or a time the release request was transmitted. Stakeholder authentication information may include, but is not limited to, security questions, security token information, digital representations of fingerprints, voice recordings, passwords, passcodes, personal identification numbers (PINs), and the like. Stakeholder authentication information may further include data provider authentication preferences, and stakeholder authentication preferences. Stakeholder contact information may include, but is not limited to, mailing addresses, physical addresses, phone numbers, email addresses, and the like.

Process 600 also includes generating 606 at least one authentication challenges, based on the authentication challenges identified 604. Authentication challenges may include, but are not limited to, a request for data, contextual information, and delivery information. The contextual information may help the receiving party understand what data is being requested of them for verification purposes. Authentication challenges may be generated 606 using the stakeholder authentication information available. In one example, when password authentication information is available, a password-based authentication challenge may be generated as a request for a password. In another example, when security question authentication information is available, a security question authentication challenge may be generated, as a request for a security phrase based upon a security question. In yet another example, when telephone number authentication information is available, a short message service (SMS) authentication challenge may be generated as a request for a random number and a SMS message to be transmitted to the telephone associated with the telephone number.

Process 600 includes transmitting 608 the generated authentication challenge. Authentication challenges may be transmitted 608 based on delivery and/or contact information available. For example, SMS based authentication challenges may include a phone number and specify an SMS delivery format. As another example, DS computing device 116 may be capable of delivering password based authentication challenges through both email and SMS communication formats, but may select the communication format based on the available contact information of a stakeholder.

Process 600 further includes receiving 610 an authentication response. For example, DS computing device 116 may receive 610 authentication responses in a number of formats corresponding to the format the authentication challenge is transmitted in. DS computing device 116 further may record metadata about the receipt of authentication responses.

Process 600 still further includes verifying 612 received authentication responses. Authentication data may be verified 612 by comparing the received data to the authentication data used by DS computing device 116 to generate 606 the authentication challenge. For example, a received authentication response may contain a password, which may be verified 612 by comparing it to a stored password. Additionally or alternatively, the metadata of authentication responses may be verified 612. Authentication response metadata may be verified 612 by comparing the metadata to metadata of other authentication responses and/or release responses. Further, authentication response metadata may be verified 612 by comparing it to the stakeholder contact information used to generate and/or transmit the authentication challenge. For example, DS computing device 116 may compare the IP address of the authentication challenge with the IP address of previous authentication challenges sent to the same stakeholder, to determine if they were received from approximately the same geographic area.

A release request may be successfully authenticated when, for example: (1) an authentication challenge is presented to the stakeholder, and an authentication response is received that is consistent with stakeholder information available; and/or (2) the release response is received through data provider computer system 106, and the release response indicates data provider computer system 106 has determined the release response was generated by an authorized party.

A release request may be unsuccessfully authenticated when, for example: (1) the metadata from the release response is not consistent with the stakeholder history; and/or (2) the stakeholder does not respond to presented authentication challenges.

As used herein, the terms "payment card," "financial payment card," and "payment card" refer to any suitable payment card, such as a credit card, a debit card, a prepaid card, a charge card, a membership card, a promotional card, a frequent flyer card, an identification card, a gift card, and/or any other device that may hold payment card information, such as mobile phones, smartphones, personal digital assistants (PDAs), key fobs, and/or computers. Each type of transactions card can be used as a method of payment for performing a payment transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A data synchronization (DS) computing device comprising one or more processors in communication with one or more memory devices, the DS computing device configured to:
  process a plurality of messages;
  identify a subset of the plurality of messages including a key value, the key value identifying at least one respective data record;
  determine a requesting party associated with the subset of the plurality of messages based on a requesting party identifier common to the subset of the plurality of messages;
  generate an update request on behalf of the requesting party identified by the requesting party identifier, the update request including the key value and the requesting party identifier;
  store the update request in a queue for subsequent processing;
  retrieve the update request from the queue;
  identify key lookup data associated with the update request by performing one or more database operations on one or more data sources, the key lookup data including one or more updated data record elements;

determine whether a release is needed from at least one stakeholder associated with the key value;
when the release is needed, transmit a release request to the stakeholder, the release request including the key value and the requesting party identifier;
receive a release response from the stakeholder, the release response indicating that the release has been authorized; and
transmit an update response to the requesting party, the update response including the key lookup data.

2. The DS computing device of claim 1, wherein the one or more database operations include a select operation performed on the one or more data sources and a join operation performed on the one or more data sources.

3. The DS computing device of claim 1, wherein the DS computing device is further configured to:
receive a declined card-on-file payment transaction message including the key value and the requesting party identifier; and
identify the subset of the plurality of messages including previously processed card-on-file payment transaction messages including the key value and the requesting party identifier.

4. The DS computing device of claim 1, wherein the DS computing device is further configured to:
determine whether authentication of the release response is needed; and
when authentication is needed, transmit an authentication challenge to the stakeholder.

5. The DS computing device of claim 4, wherein the authentication challenge includes at least one of a password, biometric, and token authentication challenge.

6. The DS computing device of claim 1, wherein the key lookup data includes at least one of an updated key value and an outdated key value.

7. The DS computing device of claim 1, wherein the key value includes a payment card identifier, and wherein the key lookup data includes at least one of an updated payment card identifier, an outdated expiration date, and an updated expiration date.

8. The DS computing device of claim 1, wherein the release request is formatted as at least one of an SMS message, an API call, an email message, and a phone message.

9. A method of data synchronization between data sources, the method implemented using a data synchronization (DS) computing device including a processor in communication with a memory, the method comprising:
processing a plurality of messages;
identifying a subset of the plurality of messages including a key value, the key value identifying at least one respective data record;
determining a requesting party associated with the subset of the plurality of messages based on a requesting party identifier common to the subset of the plurality of messages;
generating an update request on behalf of the requesting party identified by the requesting party identifier;
storing the update request in a queue for subsequent processing;
retrieving the update request from the queue;
identifying key lookup data associated with the update request by performing one or more database operations on one or more data sources, the key lookup data including one or more updated data record elements;
determining whether a release is needed from at least one stakeholder associated with the key value;
when the release is needed, transmitting a release request to the stakeholder, the release request including the key value and the requesting party identifier;
receiving a release response from the stakeholder, the release response indicating that the release has been authorized; and
transmitting an update response to the requesting party, the update response including the key lookup data.

10. The method of claim 9 wherein identifying the subset of the plurality of messages comprises:
receiving a decline card-on-file payment transaction message including the key value and the requesting party identifier; and
identifying the subset of the plurality of messages including previously processed card-on-file payment transaction messages including the key value and the requesting party identifier.

11. The method of claim 9 further comprising:
determining whether authentication of the release response is needed; and
when authentication is needed, transmitting an authentication challenge to the stakeholder.

12. The method of claim 11 wherein transmitting an authentication challenge comprises transmitting at least one of a password, biometric, and token authentication challenge.

13. The method of claim 9, wherein transmitting a release request comprises transmitting the release request formatted as at least one of an SMS message, an API call, an email message, and a phone message.

14. A non-transitory computer-readable storage medium having computer-executable instructions embodied thereon, wherein when executed by a data synchronization (DS) computing device including a processor in communication with a memory, the computer-executable instructions cause the DS computing device to:
process a plurality of messages;
identify a subset of the plurality of messages including a key value, the key value identifying at least one respective data record;
determine a requesting party associated with the subset of the plurality of messages based on a requesting party identifier common to the subset of the plurality of messages;
generate an update request on behalf of the requesting party identified by the requesting party identifier, the update request including the key value and the requesting party identifier;
store the update request in a queue for subsequent processing;
retrieve the update request from the queue;
identify key lookup data associated with the update request by performing one or more database operations on one or more data sources, the key lookup data including one or more updated data record elements;
determine whether a release is needed from at least one stakeholder associated with the key value;
when the release is needed, transmit a release request to the stakeholder, the release request including the key value and the requesting party identifier;
receive a release response from the stakeholder, the release response indicating that the release has been authorized; and
transmit an update response to the requesting party, the update response including the key lookup data.

15. The non-transitory computer-readable storage medium of claim 14, wherein the computer-executable instructions further cause the DS computing device to:
  receive a declined card-on-file payment transaction message including the key value and the requesting party identifier; and
  identify the subset of the plurality of messages including previously processed card-on-file payment transaction messages including the key value and the requesting party identifier.

16. The non-transitory computer-readable storage medium of claim 14, wherein the computer-executable instructions further cause the DS computing device to:
  determine whether authentication of the release response is needed; and
  when authentication is needed, transmit an authentication challenge to the stakeholder.

17. The non-transitory computer-readable storage medium of claim 14, wherein the key lookup data includes at least one of an updated key value and an outdated key value.

18. The non-transitory computer-readable storage medium of claim 14, wherein the key value includes a payment card identifier, and wherein the key lookup data includes at least one of an updated payment card identifier, an outdated expiration date, and an updated expiration date.

* * * * *